(12) United States Patent
Rapisanda et al.

(10) Patent No.: US 11,415,038 B2
(45) Date of Patent: Aug. 16, 2022

(54) VEHICLE COMPONENT AND HEAT SHIELD INCLUDING INTEGRAL FASTENING FEATURES FOR ATTACHING HEAT SHIELD TO VEHICLE COMPONENT

(71) Applicant: GM GLOBAL TECHNOLOGY OPERATIONS LLC, Detroit, MI (US)

(72) Inventors: Alberto Rapisanda, Turin (IT); Davide Gabriele Cinato, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 378 days.

(21) Appl. No.: 16/791,497

(22) Filed: Feb. 14, 2020

(65) Prior Publication Data
US 2021/0254536 A1    Aug. 19, 2021

(51) Int. Cl.
| F01N 13/10 | (2010.01) |
| F01N 13/14 | (2010.01) |
| B60R 13/08 | (2006.01) |
| F01N 13/18 | (2010.01) |
| E05D 1/04 | (2006.01) |

(52) U.S. Cl.
CPC ........ F01N 13/102 (2013.01); B60R 13/0876 (2013.01); F01N 13/10 (2013.01); F01N 13/14 (2013.01); F01N 13/1872 (2013.01); F01N 13/1888 (2013.01); E05D 1/04 (2013.01); F01N 13/1805 (2013.01); F01N 2260/20 (2013.01)

(58) Field of Classification Search
CPC ........ F01N 13/102; F01N 13/10; F01N 13/14; F01N 13/1872; F01N 13/1888; F01N 13/1805; F01N 2260/20; B60R 13/0876; E05D 1/04
See application file for complete search history.

(56) References Cited

U.S. PATENT DOCUMENTS

| 5,167,060 A * | 12/1992 | Nawrocki | B32B 15/14 29/513 |
| 6,438,949 B1 * | 8/2002 | Nozaki | F01N 13/14 60/272 |
| 2008/0142657 A1 * | 6/2008 | Ammer | B60K 13/04 60/299 |
| 2017/0157896 A1 * | 6/2017 | Schneider | F16L 59/147 |

FOREIGN PATENT DOCUMENTS

| CN | 107842415 A * | 3/2018 | F01N 13/10 |
| DE | 102013106651 A1 * | 1/2015 | F01N 13/10 |
| DE | 202016102418 U1 * | 9/2017 | |
| EP | 3587191 A1 * | 1/2020 | B60R 13/0876 |
| KR | 19990026428 U * | 7/1999 | |

* cited by examiner

Primary Examiner — Audrey B. Walter

(57) ABSTRACT

An assembly includes a vehicle component and a heat shield. The vehicle component includes a main body, a first plurality of teeth projecting from a first side of the main body, and a second plurality of teeth projecting from a second side of the main body opposite of the first side. The heat shield includes a first shell and a second shell. The first shell defines a first plurality of windows configured to receive the first plurality of teeth. The second shell defines a second plurality of windows configured to receive the second plurality of teeth. The heat shield is attachable to the vehicle component by positioning the heat shield such that the first plurality of teeth projects through the first plurality of windows and the second plurality of teeth projects through the second plurality of windows.

20 Claims, 4 Drawing Sheets

VEHICLE COMPONENT AND HEAT SHIELD INCLUDING INTEGRAL FASTENING FEATURES FOR ATTACHING HEAT SHIELD TO VEHICLE COMPONENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a vehicle component and a heat shield including integral fastening features for attaching the heat shield to the vehicle component.

Heat shields are attached to various components of a vehicle to protect the components from heat omitted by other components of the vehicle nearby the components to which the heat shields are attached. Heat shields are also attached to various components of the vehicle to protect other components of the vehicle from heat omitted by the components to which the heat shields are attached. Examples of vehicle components to which heat shields are attached include an exhaust manifold, an intake manifold, a turbocharger, and a catalytic converter.

SUMMARY

A first example of an assembly according to the present disclosure includes a vehicle component and a heat shield. The vehicle component includes a main body, a first plurality of teeth projecting from a first side of the main body, and a second plurality of teeth projecting from a second side of the main body opposite of the first side. The heat shield includes a first shell and a second shell. The first shell defines a first plurality of windows configured to receive the first plurality of teeth. The second shell defines a second plurality of windows configured to receive the second plurality of teeth. The heat shield is attachable to the vehicle component by positioning the heat shield such that the first plurality of teeth projects through the first plurality of windows and the second plurality of teeth projects through the second plurality of windows.

In one example, the first shell and the second shell are formed together as a unitary body.

In one example, the first shell and the second shell are formed separate from one another and attached to one another using a hinge.

In one example, the first plurality of teeth has a first profile, and the second plurality of teeth has a second profile that is different than the first profile.

In one example, the first profile is curved profile and the second profile is an L-shaped profile.

In one example, the first plurality of windows has a first shape, and the second plurality of windows has a second shape that is different than the first shape.

In one example, the first plurality of windows has a first width, and the second plurality of windows has a second width that is greater than the first width.

In one example, each window in the first plurality of windows has a rectangular shape, and each window in the second plurality of windows includes a first rectangular portion having a first height and a second rectangular portion having a second height that is less than the first height.

In one example, the first and second shells collectively have a C-shaped cross-section.

In one example, the main body of the vehicle component has a first surface disposed on the first side of the main body, a second surface disposed on the second side of the main body, and a third surface disposed between the first and second surfaces. In this example, the first shell is configured to cover at least a section of the first surface and a first section of the third surface. Also, in this example, the second shell is configured to cover at least a section of the second surface and a second section of the third surface.

In one example, the vehicle component is an exhaust manifold.

A second example of an assembly according to the present disclosure includes a vehicle component and a heat shield. The vehicle component includes a main body, a first plurality of teeth, and a second plurality of teeth. The main body has a first surface disposed on a first side of the main body, a second surface disposed on a second side of the main body opposite of the first side, and a third surface disposed between the first and second surfaces. The first plurality of teeth projects from the first surface of the main body. The second plurality of teeth projects from the second surface the main body. The heat shield includes a first shell and a second shell. The first shell is configured to cover at least a section of the first surface and a first section of the third surface. The second shell is configured to cover at least a section of the second surface and a second section of the third surface. The first shell defines a first plurality of windows configured to receive the first plurality of teeth. The second shell defines a second plurality of windows configured to receive the second plurality of teeth. The heat shield is attachable to the vehicle component by positioning the heat shield such that the first plurality of teeth projects through the first plurality of windows and the second plurality of teeth projects through the second plurality of windows.

In one example, the first shell and the second shell are formed together as a unitary body.

In one example, the first shell and the second shell are formed separate from one another and attached to one another using a plurality of hinges.

In one example, the main body of the vehicle component has a fourth surface opposite of the third surface and spaced apart from the third surface in a first direction, the first plurality of teeth projects from the first surface of the main body in the first direction and in a second direction perpendicular to the first surface, and the second plurality of teeth projects from the second surface of the main body in the first direction and in a third direction perpendicular to the second surface.

In one example, the first plurality of teeth has a curved profile and form an angle with the first surface that is less than 90 degrees, and the second plurality of teeth have an L-shaped profile, with each tooth in the second plurality of teeth including a first portion that projects from the second surface of the main body in the third direction by a first distance and a second portion that projects from the first portion in the first direction by a second distance.

In one example, each window in the first plurality of windows has a rectangular shape and a first width that is greater than a width of each tooth in the first plurality of teeth, each window in the second plurality of windows includes a first rectangular section and a second rectangular section, the first rectangular section having a first height that is greater than the second distance, the second rectangular section having a second height that is less than the second distance and greater than a thickness of each tooth, and each window in the second plurality of windows has a second width that is greater than twice a width of each tooth in the second plurality of teeth.

A third example of an assembly according to the present disclosure includes an exhaust manifold and a heat shield. The exhaust manifold includes a main body, a first plurality of teeth, and a second plurality of teeth. The main body has a first surface disposed on a first side of the main body, a second surface disposed on a second side of the main body opposite of the first side, a third surface disposed between the first and second surfaces, and a fourth surface opposite of the third surface and spaced apart from the third surface in a first direction. Each tooth in the first plurality of teeth has a curved profile and projecting from the first surface of the main body in the first direction and in a second direction perpendicular to the first surface. Each tooth in the second plurality of teeth has an L-shaped profile and includes a first portion and a second portion. The first portion projects from the second surface in a third direction perpendicular to the second surface by a first distance. The second portion projects from the first portion in the first direction by a second distance. The heat shield includes a first shell and a second shell. The first shell is configured to cover at least a section of the first surface and a first section of the third surface. The second shell is configured to cover at least a section of the second surface and a second section of the third surface. The first shell defines a first plurality of windows with each window in the first plurality of windows having a first width that is greater than a width of each tooth in the first plurality of teeth. The second shell defines a second plurality of windows with each window in the second plurality of windows having a second width that is greater than twice a width of each tooth in the second plurality of teeth. Each window in the second plurality of windows includes a first rectangular portion and a second rectangular portion. The first rectangular portion has a first height that is greater than the second distance. The second rectangular portion has a second height that is less than the second distance and greater than a thickness of each tooth in the second plurality of teeth. The heat shield is attachable to the exhaust manifold by positioning the heat shield such that the second plurality of teeth projects through the first rectangular portions of the second plurality of windows, and then repositioning the heat shield such that first plurality of teeth projects through the first plurality of windows and the second plurality of teeth projects through the second rectangular portions of the second plurality of windows.

In one example, the first shell and the second shell are formed together as a unitary body.

In one example, the first shell and the second shell are formed separate from one another and attached to one another using a plurality of hinges.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Conventionally, heat shields are attached to vehicle components using fasteners such as screws or bolts. In contrast, the present disclosure provides an assembly including a vehicle component and a heat shield with integral fastening features that enable attaching the heat shield to the vehicle component without using fasteners such as screws or bolts. In one example, the fastening features include windows in the heat shield and teeth on the vehicle component that project through the windows to secure the heat shield to the vehicle component. By eliminating the need to use fasteners such as screws or bolts, the assembly according the present disclosure reduces assembly costs and complexity, and reduces the time required to attach the heat shield to the vehicle component on the vehicle assembly line and during service activity. In addition, the assembly according to the present disclosure enables attaching the heat shield to the vehicle component by hand without using additional components or tools.

Figure 1:
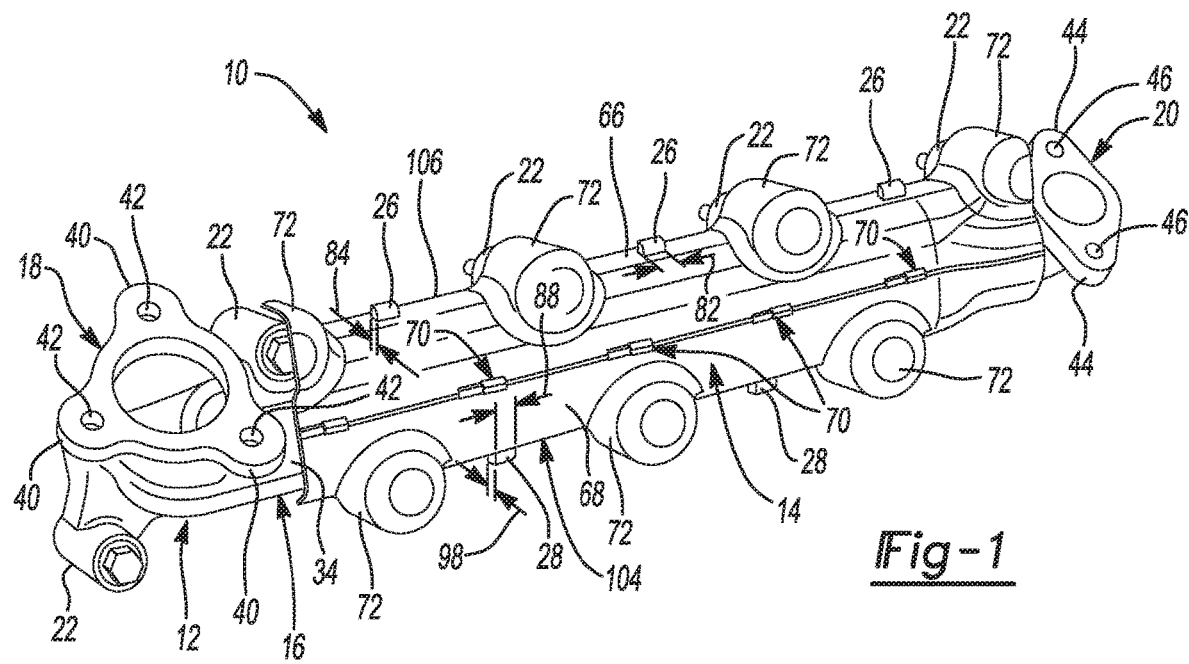
FIG. 1 is a perspective view of an assembly including an example exhaust manifold and a first example heat shield according to the present disclosure.

Referring now to FIG. 1, an assembly 10 includes an exhaust manifold 12 and a heat shield 14. The exhaust manifold 12 is configured to receive exhaust gas from cylinders of an engine (not shown) in a vehicle and to deliver the exhaust gas to a tailpipe (not shown) of the vehicle. Exhaust manifold 12 may also be configured to deliver a portion of the exhaust gas to an exhaust gas recirculation (EGR) pipe (not shown) of the vehicle. The exhaust manifold 12 may be formed (e.g., casted) from a metal (e.g., steel).

When the heat shield 14 is attached to the exhaust manifold 12 as shown in FIG. 1, the heat shield 14 protects components of the vehicle located near the exhaust manifold 12 from heat omitted by the exhaust manifold 12. The heat shield 14 is formed (e.g., stamped, molded) from one or more heat insulating materials (e.g., metal, plastic, glass). In one example, the heat shield 14 includes a compressed fiberglass layer sandwiched between a pair of aluminum layers. The heat shield 14 is configured to be attached to the exhaust manifold 12 without using fasteners such as screws or bolts.

Figure 5A:
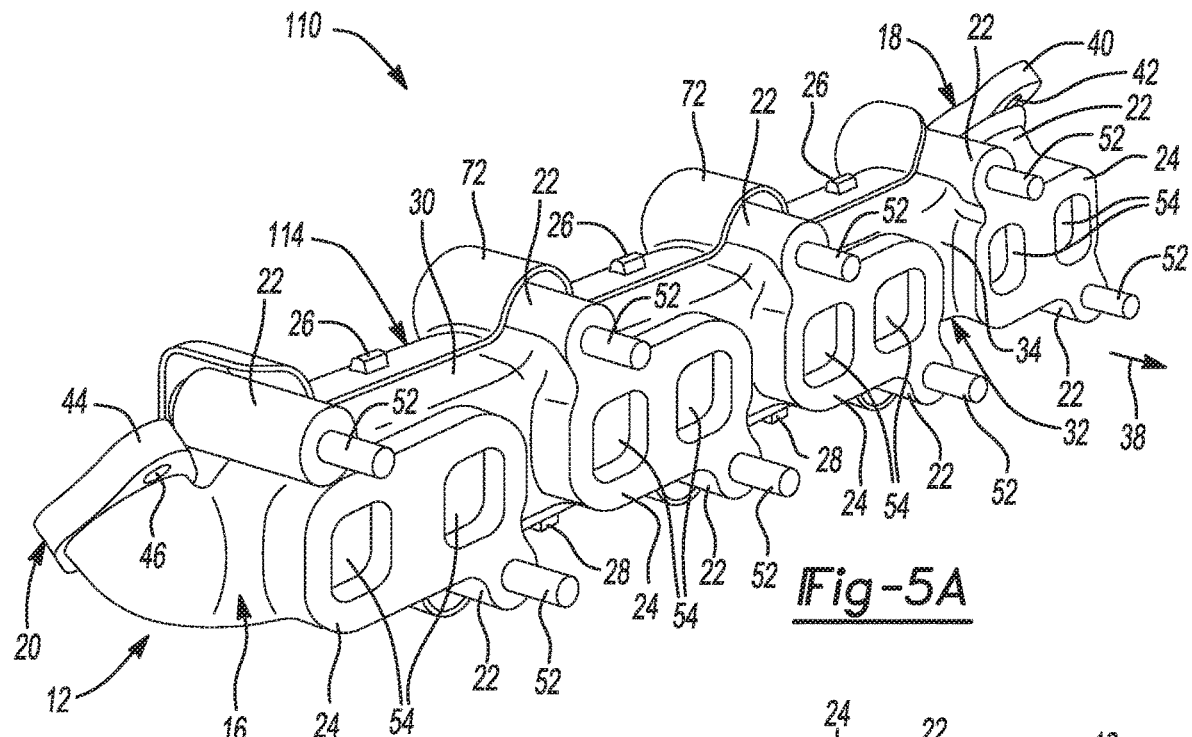
FIG. 5A is another perspective view of the assembly of FIG. 3.
Figure 5B:
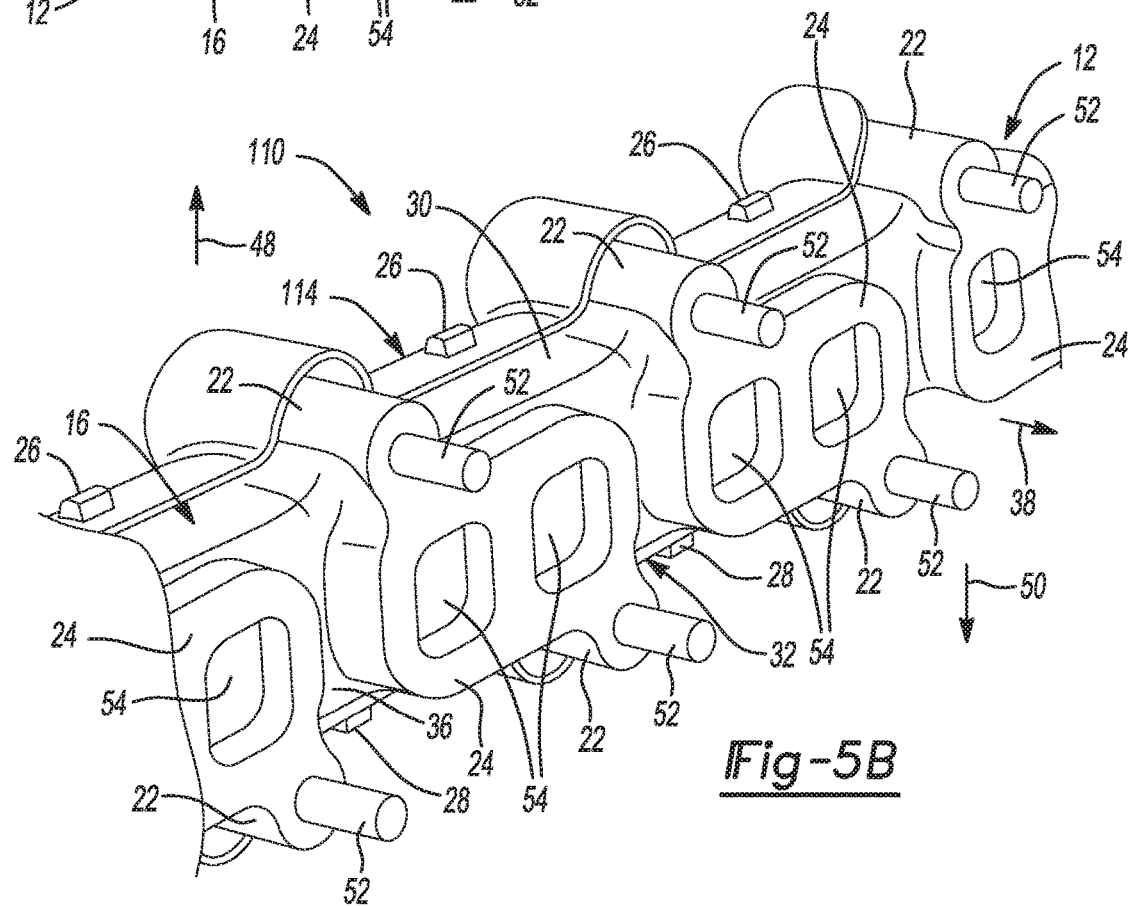
FIG. 5B is an enlargement of a portion of the assembly shown in FIG. 5A.

With additional reference to FIGS. 5A and 5B, the exhaust manifold 12 includes a main body 16, a first flange 18, a second flange 20, a plurality of hollow bosses 22, a plurality of rectangular projections 24, a first plurality of teeth 26, and a second plurality of teeth 28. The main body 16 of the exhaust manifold 12 is a tubular structure with a rectangular or oval cross-section. The main body 16 has a first surface 30 disposed on a first side of the main body 16, a second surface 32 disposed on a second side of the main body 16 opposite of the first side, a third surface 34 disposed between the first and second surfaces 30 and 32, and a fourth surface 36 opposite of the third surface 34. The fourth surface 36 is spaced apart from the third surface 34 in a first direction 38.

The first flange 18 of the exhaust manifold 12 projects from the main body 16 and includes three ears 40, with each ear 40 defining a fastener hole 42. Fasteners may be inserted through the fastener holes 42 in the first flange 18 and through holes in a corresponding flange on the tailpipe to attach the exhaust manifold 12 to the tailpipe. The second flange 20 of the exhaust manifold 12 projects from the main body 16 and includes two ears 44, with each ear 44 defining a fastener hole 46. Fasteners may be inserted through the fastener holes 46 in the second flange 20 and through holes in a corresponding flange on the EGR pipe to attach the exhaust manifold 12 to the EGR pipe.

The hollow bosses 22 on the first side of the main body 16 project from the first surface 30 of the main body 16 in a second direction 48 perpendicular to the first surface 30. The hollow bosses 22 on the second side of the main body 16 project from the second surface 32 of the main body 16 in a third direction 50 perpendicular to the second surface 32 and opposite of the second direction 48. Fasteners (e.g., screws) 52 are inserted through the hollow bosses 22 on both sides of the main body 16 to attach the exhaust manifold 12 to the engine.

The rectangular projections 24 project from the fourth surface 36 of the main body 16 in the first direction 38. Each rectangular projection 24 defines a pair of rectangular openings 54. When the exhaust manifold 12 is attached to the engine, the rectangular openings 54 are positioned over exhaust ports of the cylinders to receive exhaust gas therefrom.

Figure 4:
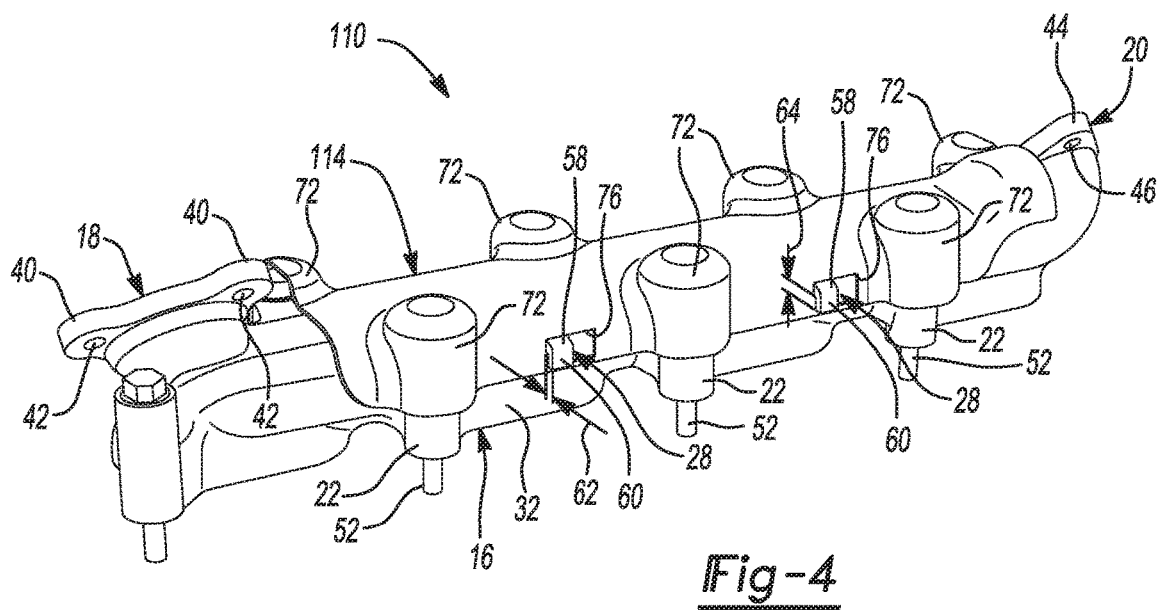
FIG. 4 is another perspective view of the assembly of FIG. 3.
Figure 6:
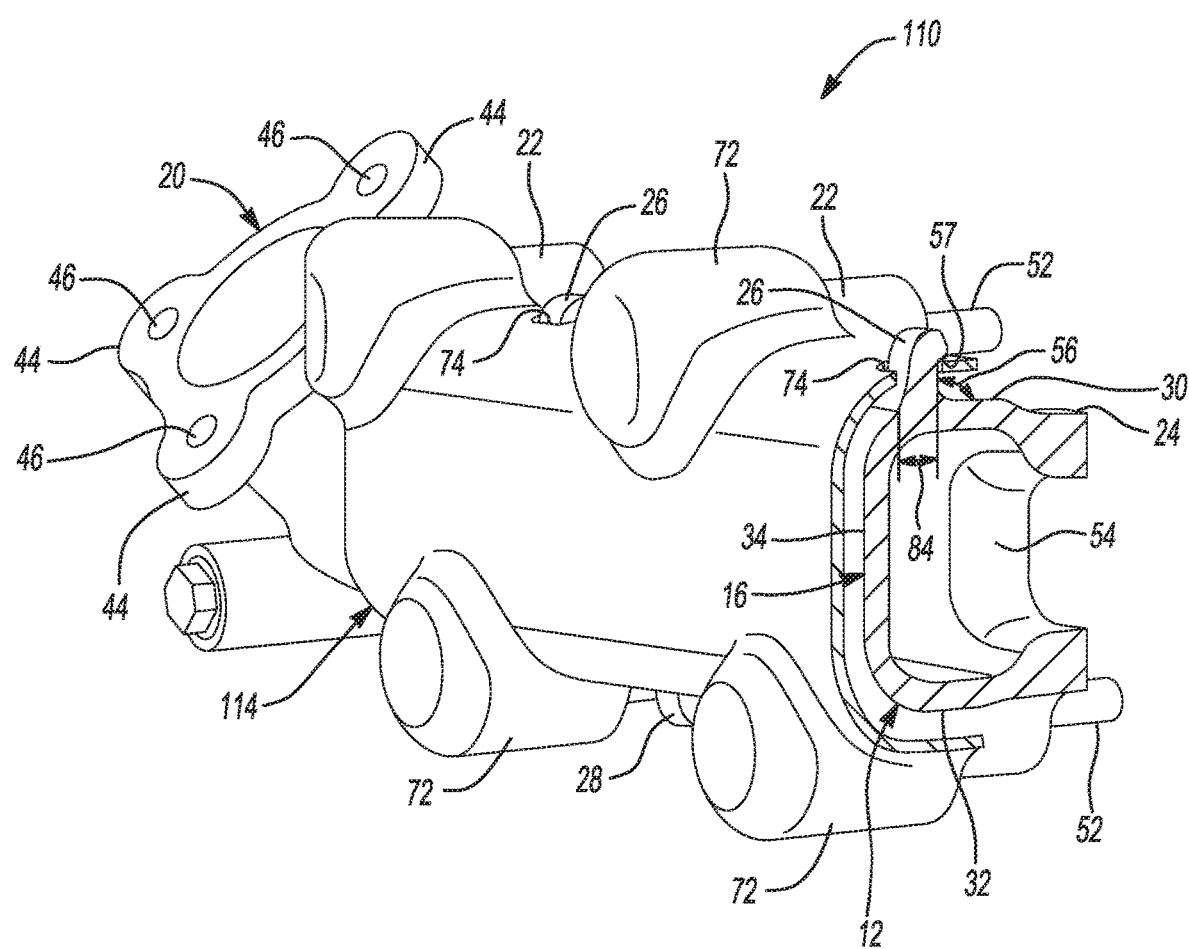
FIG. 6 is a sectioned perspective view of the assembly of FIG. 3.

Referring now to FIGS. 4 and 6, the first plurality of teeth 26 projects from the first surface 30 of the main body 16 in the first and second directions 38 and 48. Each tooth 26 has a curved profile and forms an angle 56 with the first surface 30 of the main body 16 that is less than 90 degrees. In addition, each tooth 26 includes a hooked end or tip 57. The second plurality of teeth 28 projects from the second surface 32 of the main body 16 in the first and third directions 38 and 50. Each tooth 28 has an L-shaped profile and includes a first portion 58 and a second portion 60. The first portion 58 of each tooth 28 projects from the second surface 32 of the main body 16 in the third direction 54 by a first distance 62. The second portion 60 of each tooth 28 projects from the first portion 58 of each tooth 28 by a second distance 64.

Figure 2:
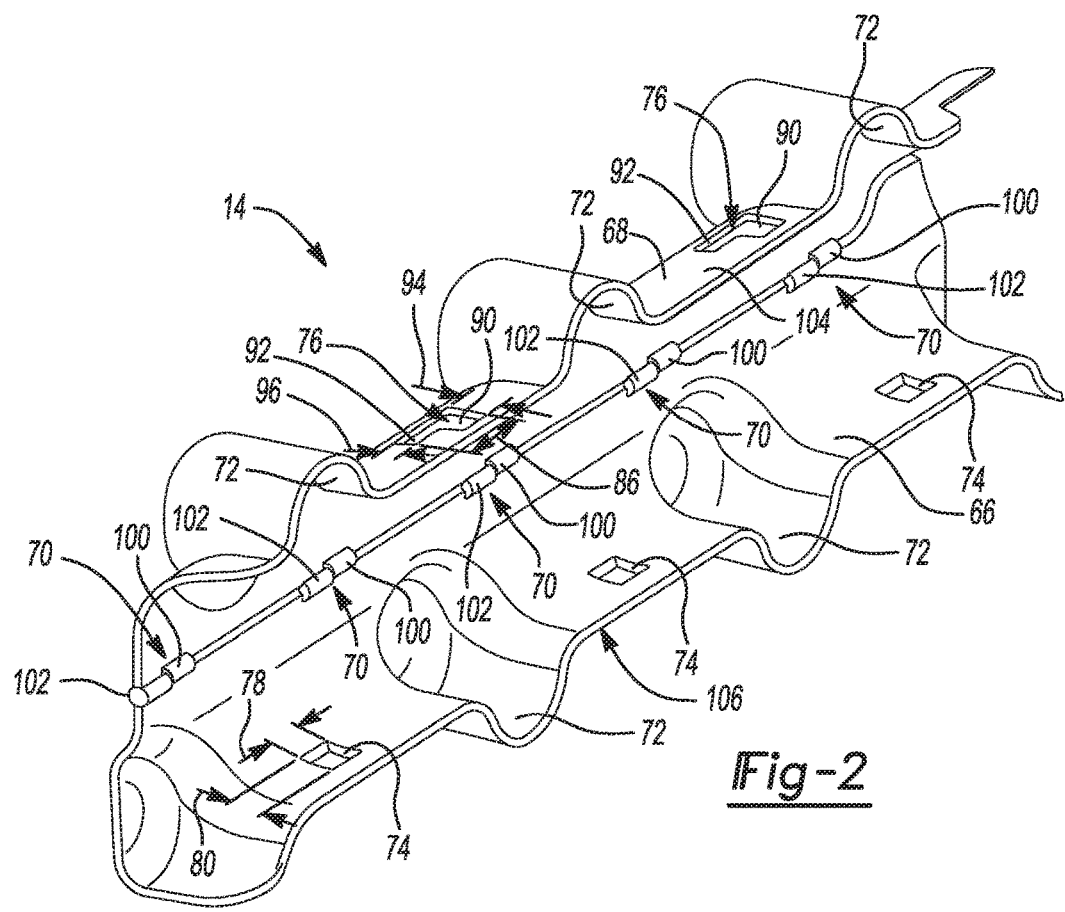
FIG. 2 is another perspective view of a portion of the heat shield of FIG. 1.
Figure 3:
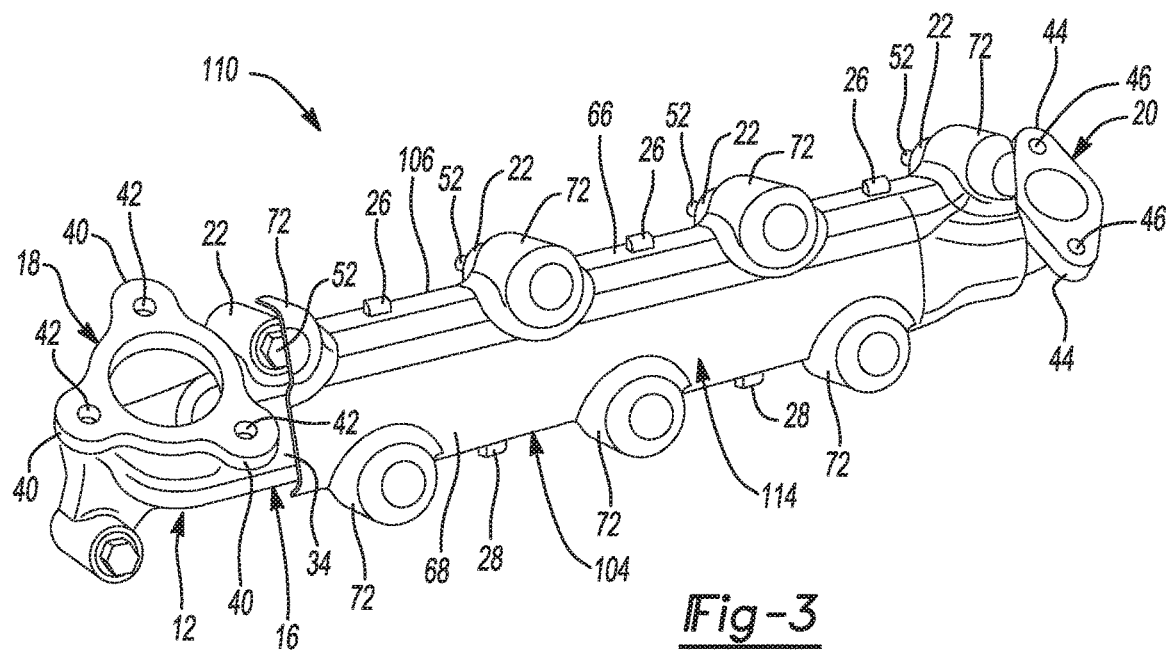
FIG. 3 is a perspective view of an assembly including the exhaust manifold of FIG. 1 and a second example heat shield according to the present disclosure.

Referring now to FIGS. 1 and 2, the heat shield 14 includes a first shell 66, a second shell 68, and a plurality of hinges 70 pivotally coupling the first and second shells 66 and 68 to one another. The first and second shells 66 and 68 collectively have a C-shaped cross-section (FIG. 6). When the heat shield 14 is attached to the exhaust manifold 12, the first shell 66 of the heat shield 14 covers a majority of the first surface 30 of the exhaust manifold 12 and a first section of the third surface 34 of the exhaust manifold 12. Similarly, when the heat shield 14 is attached to the exhaust manifold 12, the second shell 68 of the heat shield 14 covers a majority of the second surface 32 of the exhaust manifold 12 and a second section of the third surface 34 of the exhaust manifold 12. The first section of the third surface 34 extends from the first surface 30 to the second section of the third surface 34. The second section of the third surface 34 extends from the first section of the third surface 34 to the second surface 32.

Each of the first and second shells 66 and 68 defines a plurality of sockets 72 that receives the bosses 22 on the exhaust manifold 12 when the heat shield 14 is attached to the exhaust manifold 12. In addition, the first shell 66 defines a first plurality of windows 74 that receive the first plurality of teeth 26 on the exhaust manifold 12, and the second shell 68 defines a second plurality of windows 76 that receives the second plurality of teeth 28 on the exhaust manifold 12. Each window 74 in the first shell 66 has a rectangular shape with a width 78 and a height 80. The width 78 of each window 74 is greater than a width 82 of each tooth 26. The height 80 of each window 76 is greater than a thickness 84 of each tooth 26.

Each window 76 in the second shell 68 has a width 86 that is greater than a width 88 of each tooth 28. In addition, each window 76 in the second shell 68 includes a first rectangular portion 90 and a second rectangular portion 92. The first rectangular portion 90 of each window 76 has a first height 94, and the second rectangular portion 92 of each window 76 has a second height 96. The first height 94 is greater than the second distance 64 by which the second portion 60 of each tooth 28 projects from the first portion 58 of each tooth 28. The second height 96 is less than the first height 94 and is greater than a thickness 98 of each tooth 28.

The size of the first rectangular portion 90 of each window 76 in the second shell 68 may be equal to the size of each window 74 in the first shell 66. For example, the first height 94 of the first rectangular portion 90 of each window 76 may be equal to the height 80 of each window 74. In addition, the second height 96 of the second rectangular portion 92 of each window 76 may be equal to about one-half of the first height 94 of the first rectangular portion 90 of each window 76. In one example, the second height 96 of the second rectangular portions 92 is only slightly greater than the thickness 98 of each tooth 28.

The hinges 70 allow the first and second shells 66 and 68 to pivot relative to one another about a pivot axis defined by the hinges 70. Each of the hinges 70 includes a first barrel 100 that projects from the first shell 66, a second barrel 102 that projects from the second shell 68, and a pin (not shown) that is captured between the first and second barrels 100 and 102. In this regard, the hinges 70 may be referred to as barrel hinges or pin hinges.

To attach the heat shield 14 to the exhaust manifold 12, the heat shield 14 is first positioned so that the second plurality of teeth 28 projects through the first rectangular portions 90 of the second plurality of windows 76 and the second shell 68. Since the first height 94 of the first rectangular portions 90 is greater than the second distance 64 by which the second portion 60 of each tooth 28 projects from the first portion 58 of each tooth 28, the teeth 28 may be inserted through the first rectangular portions 90 in the second direction 48 without any interference.

Then, the heat shield 14 is repositioned so that the second plurality of teeth 28 projects through the second rectangular portions 92 of the second plurality of windows 76 instead of the first rectangular portions 90 of the second plurality of windows 76. As indicated above, the second height 96 of the second rectangular portions 92 is less than the second distance 64 by which the second portion 60 of each tooth 28 projects from the first portion 58. Thus, when the first portions 58 of the teeth 28 project through the second rectangular portions 92 of the windows 76, the second portions 60 of the teeth 28 engage an outer surface 106 of the second shell 68 to secure the second shell 68 to the exhaust manifold 12.

Once the second shell 68 is secured to the exhaust manifold 12, the first shell 66 is rotated about the hinges 70 until the first plurality of teeth 26 projects through the first plurality of windows 74 in the first shell 66. When the teeth 26 project through the windows 76, the hooked tips 57 (FIG. 6) of the teeth 26 engage an outer surface 106 of the first shell 66 to secure the first shell 66 to the exhaust manifold 12. Thus, when the first and second plurality of teeth 26 and 28 projects through the first and second plurality of windows 74 and 76, respectively, the heat shield 14 is secured to the exhaust manifold 12 on the first and second sites thereof. Further, no fasteners such as screws or bolts are needed to secure the heat shield 14 to the exhaust manifold 12.

Referring now to FIGS. 3, 4, 5A, 5B, and 6, an assembly 110 is similar or identical to the assembly 10 except for one aspect. As discussed above, the assembly 10 includes the exhaust manifold 12 and the heat shield 14, and the heat shield 14 includes the first and second shells 66 and 68. Similarly, the assembly 110 includes the exhaust manifold 12 and a heat shield 114, and the heat shield 114 includes the first and second shells 66 and 68. However, in the assembly 10, the first and second shells 66 and 68 of the heat shield 14 are formed separate from one another and attached to one another using the hinges 70. In contrast, in the assembly 110, the first and second shells 66 and 68 of the heat shield 114 are formed together in a single operation as a unitary body, and the hinges 70 are omitted. The heat shield 114 may otherwise be similar or identical to the heat shield 14.

The manner in which the heat shield 114 is attached to the exhaust manifold 12 may be similar or identical to the manner in which the heat shield 114 is attached to exhaust manifold 12. For example, the heat shield 114 may be positioned so that the teeth 28 project through the first portions 90 of the windows 76 in the second shell 68, and then the heat shield 114 may be repositioned so that the teeth 28 project through the second portions 92 of the windows 76. Then, the entire heat shield 114 may be rotated into contact with the first and third surfaces 30 and 34 of the exhaust manifold 12. At the same time, the windows 74 and the first shell 66 may be positioned so that the teeth 26 project through the windows 74. As the heat shield 114 is rotated so that the windows 76 are aligned with the teeth 26, the heat shield 114 may flex outward until the teeth 26 project through the windows 76, at which point the heat shield 114 may return to its original or relaxed state.

Since the hinges 70 are omitted from the heat shield 114, the heat shield 114 of the assembly 110 is less complex and less costly than the heat shield 14 of the assembly 10. However, due to the presence of the hinges 70, the heat shield 14 may be easier to assemble than the heat shield 114. Factors to consider in deciding whether to use the design of the heat shield 14 or the design of the heat shield 114 include the flexibility of the heat shield material(s) and the heat shield shape.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An assembly comprising:
   a vehicle component including a main body, a first plurality of teeth projecting from a first side of the main body, and a second plurality of teeth projecting from a second side of the main body opposite of the first side; and
   a heat shield including a first shell and a second shell, the first shell defining a first plurality of windows configured to receive the first plurality of teeth, the second shell defining a second plurality of windows configured to receive the second plurality of teeth, wherein the heat shield is attachable to the vehicle component by positioning the heat shield such that the first plurality of teeth project through the first plurality of windows and the second plurality of teeth project through the second plurality of windows.

2. The assembly of claim 1 wherein the first shell and the second shell are formed together as a unitary body.

3. The assembly of claim 1 wherein the first shell and the second shell are formed separate from one another and attached to one another using a hinge.

4. The assembly of claim 1 wherein the first plurality of teeth has a first profile, and the second plurality of teeth has a second profile that is different than the first profile.

5. The assembly of claim 4 wherein the first profile is curved profile and the second profile is an L-shaped profile.

6. The assembly of claim 1 wherein the first plurality of windows has a first shape, and the second plurality of windows has a second shape that is different than the first shape.

7. The assembly of claim 1 wherein the first plurality of windows has a first width, and the second plurality of windows has a second width that is greater than the first width.

8. The assembly of claim 1 wherein each window in the first plurality of windows has a rectangular shape, and each window in the second plurality of windows includes a first rectangular portion having a first height and a second rectangular portion having a second height that is less than the first height.

9. The assembly of claim 1 wherein the first and second shells collectively have a C-shaped cross-section.

10. The assembly of claim 1 wherein:
    the main body of the vehicle component has a first surface disposed on the first side of the main body, a second surface disposed on the second side of the main body, and a third surface disposed between the first and second surfaces;

the first shell is configured to cover at least a section of the first surface and a first section of the third surface; and the second shell is configured to cover at least a section of the second surface and a second section of the third surface.

11. The assembly of claim 1 wherein the vehicle component is an exhaust manifold.

12. An assembly comprising:
a vehicle component including a main body, a first plurality of teeth, and a second plurality of teeth, the main body having a first surface disposed on a first side of the main body, a second surface disposed on a second side of the main body opposite of the first side, and a third surface disposed between the first and second surfaces, the first plurality of teeth projecting from the first surface of the main body, the second plurality of teeth projecting from the second surface the main body; and
a heat shield including a first shell and a second shell, the first shell being configured to cover at least a section of the first surface and a first section of the third surface, the second shell being configured to cover at least a section of the second surface and a second section of the third surface, the first shell defining a first plurality of windows configured to receive the first plurality of teeth, the second shell defining a second plurality of windows configured to receive the second plurality of teeth, wherein the heat shield is attachable to the vehicle component by positioning the heat shield such that the first plurality of teeth projects through the first plurality of windows and the second plurality of teeth projects through the second plurality of windows.

13. The assembly of claim 12 wherein the first shell and the second shell are formed together as a unitary body.

14. The assembly of claim 12 wherein the first shell and the second shell are formed separate from one another and attached to one another using a plurality of hinges.

15. The assembly of claim 12 wherein:
the main body of the vehicle component has a fourth surface opposite of the third surface and spaced apart from the third surface in a first direction;
the first plurality of teeth projects from the first surface of the main body in the first direction and in a second direction perpendicular to the first surface; and
the second plurality of teeth projects from the second surface of the main body in the first direction and in a third direction perpendicular to the second surface.

16. The assembly of claim 15 wherein:
the first plurality of teeth has a curved profile and form an angle with the first surface that is less than 90 degrees; and
the second plurality of teeth has an L-shaped profile, with each tooth in the second plurality of teeth including a first portion that projects from the second surface of the main body in the third direction by a first distance and a second portion that projects from the first portion in the first direction by a second distance.

17. The assembly of claim 16 wherein:
each window in the first plurality of windows has a rectangular shape and a first width that is greater than a width of each tooth in the first plurality of teeth;

each window in the second plurality of windows includes a first rectangular section and a second rectangular section, the first rectangular section having a first height that is greater than the second distance, the second rectangular section having a second height that is less than the second distance and greater than a thickness of each tooth; and each window in the second plurality of windows has a second width that is greater than twice a width of each tooth in the second plurality of teeth.

18. An assembly comprising:
an exhaust manifold including a main body, a first plurality of teeth, and a second plurality of teeth, the main body having a first surface disposed on a first side of the main body, a second surface disposed on a second side of the main body opposite of the first side, a third surface disposed between the first and second surfaces, and a fourth surface opposite of the third surface and spaced apart from the third surface in a first direction, each tooth in the first plurality of teeth having a curved profile and projecting from the first surface of the main body in the first direction and in a second direction perpendicular to the first surface, each tooth in the second plurality of teeth having an L-shaped profile and including a first portion and a second portion, the first portion projecting from the second surface in a third direction perpendicular to the second surface by a first distance, the second portion projecting from the first portion in the first direction by a second distance; and
a heat shield including a first shell and a second shell, the first shell being configured to cover at least a section of the first surface and a first section of the third surface, the second shell being configured to cover at least a section of the second surface and a second section of the third surface, the first shell defining a first plurality of windows with each window in the first plurality of windows having a first width that is greater than a width of each tooth in the first plurality of teeth, the second shell defining a second plurality of windows with each window in the second plurality of windows having a second width that is greater than twice a width of each tooth in the second plurality of teeth, and each window in the second plurality of windows including a first rectangular portion and a second rectangular portion, the first rectangular portion having a first height that is greater than the second distance, the second rectangular portion having a second height that is less than the second distance and greater than a thickness of each tooth in the second plurality of teeth, wherein the heat shield is attachable to the exhaust manifold by positioning the heat shield such that the second plurality of teeth projects through the first rectangular portions of the second plurality of windows, and then repositioning the heat shield such that first plurality of teeth projects through the first plurality of windows and the second plurality of teeth projects through the second rectangular portions of the second plurality of windows.

19. The assembly of claim 18 wherein the first shell and the second shell are formed together as a unitary body.

20. The assembly of claim 18 wherein the first shell and the second shell are formed separate from one another and attached to one another using a plurality of hinges.

* * * * *